(12) United States Patent
Kaye et al.

(10) Patent No.: US 8,206,673 B2
(45) Date of Patent: Jun. 26, 2012

(54) METHOD OF PREPARING BORON-NITROGEN COMPOUNDS

(75) Inventors: Steven Kaye, San Diego, CA (US); Conor Riley, San Diego, CA (US)

(73) Assignee: Wildcat Discovery Technologies, San Diego, CA (US)

( * ) Notice: Subject to any disclaimer, the term of this patent is extended or adjusted under 35 U.S.C. 154(b) by 84 days.

(21) Appl. No.: 12/882,701

(22) Filed: Sep. 15, 2010

(65) Prior Publication Data

US 2011/0064640 A1   Mar. 17, 2011

Related U.S. Application Data

(60) Provisional application No. 61/242,932, filed on Sep. 16, 2009.

(51) Int. Cl.
*C01B 35/08* (2006.01)
(52) U.S. Cl. ......................................... 423/285
(58) Field of Classification Search .................. 423/285
See application file for complete search history.

(56) References Cited

U.S. PATENT DOCUMENTS

| | | | |
|---|---|---|---|
| 4,157,927 A | 6/1979 | Chew et al. | |
| 5,612,013 A * | 3/1997 | Sneddon et al. | 423/285 |
| 2007/0243122 A1 | 10/2007 | Ramachandran et al. | |
| 2008/0311017 A1 | 12/2008 | Burrell et al. | |

OTHER PUBLICATIONS

Zhitao Xiong, Chaw Keong Yong, Guotao Wu, Ping Chen, Wendy Shaw, Abhi Karkamkar, Thomas Autrey, Martin Owen Jones, Simon R. Johnson, Peter P. Edwards, William I.F. David; "High-capacity hydrogen storage in lithium and sodium amidoboranes"; Nature Materiais Journal, Feb. 2008, pp. 138-141, vol. 7, Nature Publishing Group.

"Material Matters Chemistry Driving Performance Hydrogen Storage Materials", Sigma-Aldrich, 2007, vol. 2 No. 2, Sigma-Aldrich Corporation, Milwaukee, Wisconsin.
Clinton F. Lane; "Ammonia-Borane and Related N-B-H Compounds and Materials: Safety Aspects, Properties and Applications", N-B-H Survey, Apr. 17, 2006, pp. 1-33, Department of Chemistry and Biochemistry Northern Arizona University.
David J. Heldebrant, Abhi Karkamkar, John C. Linehan, Tom Autrey; "Synthesis of ammonia borane for hydrogen storage applications"; Energy & Environmental Science, 2008, pp. 156-160, vol. 1, RSC Publishing.
Bo Peng, Jun Chen; "Ammonia borane as an efficient and lightweight hydrogen storage medium"; Energy & Environmental Science, 2008, pp. 479-483, vol. 1, RSC Publishing.
Ashely C. Stowe, Polly A. Berseth, Thomas P. Farrell, Laura Laughlin, Donald Anton, Ragaiy Zidan; "Investigation of the thermodynamics governing metal hydride synthesis in the molten state process", Journal of Alloys and Compounds, Oct. 2008, pp. 41-46, vol. 465 issues 1-2, Elsevier B.V.
Philip P. Power; "Chemical Hydrogen Storage Using Ultra-High Surface Area Main Group Materials & The Development of Efficient Amine-Borane Regeneration Cycles", U.S. Department of Energy Hydrogen Program—2009 Annual Progress Report, Chemical Hydrogen Storage Center of Excellence—Project ID# ST11 of University of California, Apr. 15, 2008.
Vladimir V. Volkov, Klavdy G. Myakishev; "Mechanochemical Technology of Borane Compounds and Their Application", Chemistry for Substainable Development, 2002, pp. 221-233, 10.
Vladimir V. Volkov, Klavdi G. Myakishev; "Mechanochemical reactions in the chemistry of boranes"; Inorganica Chimica Acta, Jun. 1999, pp. 51-57, vol. 289 issues 1-2, Elsevier Science S.A.

* cited by examiner

*Primary Examiner* — Timothy Vanoy
(74) *Attorney, Agent, or Firm* — Quinn Law Group, PLLC

(57) ABSTRACT

A method of preparing a boron-nitrogen compound includes combining an ammonium salt and an ionic compound in the absence of solvent to form a mixture. The ionic compound includes a cation and an anion. The anion is represented by the general formula $B(R^1)_4^-$, wherein each $R^1$ is independently selected from the group of hydrogen, alkyl groups, aryl groups, and combinations thereof. The method also includes agitating the mixture in the absence of solvent to form a reaction product, and separating the boron-nitrogen compound from the reaction product.

20 Claims, 2 Drawing Sheets

1

METHOD OF PREPARING BORON-NITROGEN COMPOUNDS

CROSS-REFERENCE TO RELATED APPLICATIONS

This application claims the benefit of U.S. Provisional Patent Application No. 61/242,932, filed Sep. 16, 2009, which is hereby incorporated by reference in its entirety.

TECHNICAL FIELD

The present disclosure generally relates to preparing boron-nitrogen compounds, and more specifically, to preparing boron-nitrogen compounds via mechanical agitation.

BACKGROUND

Hydrogen exhibits clean combustion when burned and has an excellent heating value. Therefore, hydrogen may replace traditional fossil fuels for transportation and other applications if suitable hydrogen storage compounds are available. Boron-nitrogen compounds are one such hydrogen storage compound currently under investigation. However, to be useful for hydrogen storage applications, boron-nitrogen compounds must be cost-effective to produce on an industrial scale, available in sufficient purity, and must exhibit excellent hydrogen storage and release characteristics.

Presently, boron-nitrogen compounds may be synthesized via a solution process that includes flammable organic solvents. Therefore, traditional methods of preparing boron-nitrogen compounds are costly and difficult.

SUMMARY

A method of preparing a boron-nitrogen compound includes combining an ammonium salt and an ionic compound in the absence of solvent to form a mixture. The ionic compound includes a cation and an anion, and the anion is represented by the general formula $B(R^1)_4^-$. Each $R^1$ is independently selected from the group of hydrogen, alkyl groups, aryl groups, and combinations thereof. The mixture is agitated in the absence of solvent to form a reaction product. The method further includes separating the boron-nitrogen compound from the reaction product.

In another embodiment, a method of preparing a boron-nitrogen compound includes agitating the ammonium salt in the absence of solvent and agitating the ionic compound in the absence of solvent. Further, the method includes combining the agitated ammonium salt and the agitated ionic compound in the absence of solvent to form a mixture. The mixture is agitated in the absence of solvent to form a reaction product, and the boron-nitrogen compound is separated from the reaction product.

The methods of the present disclosure are cost effective and prepare effective, reliable boron-nitrogen compounds in sufficient yield and purity that have excellent hydrogen storage and release characteristics. That is, since the boron-nitrogen compounds are prepared via mechanical agitation in the absence of solvent, the methods minimize the use of expensive and flammable solvents. The methods also minimize the production of hydrogen gas in the presence of such flammable solvents.

The above features and advantages and other features and advantages of the present disclosure are readily apparent from the following detailed description of the best modes for carrying out the disclosure when taken in connection with the accompanying drawings.

DETAILED DESCRIPTION

Figure 1:
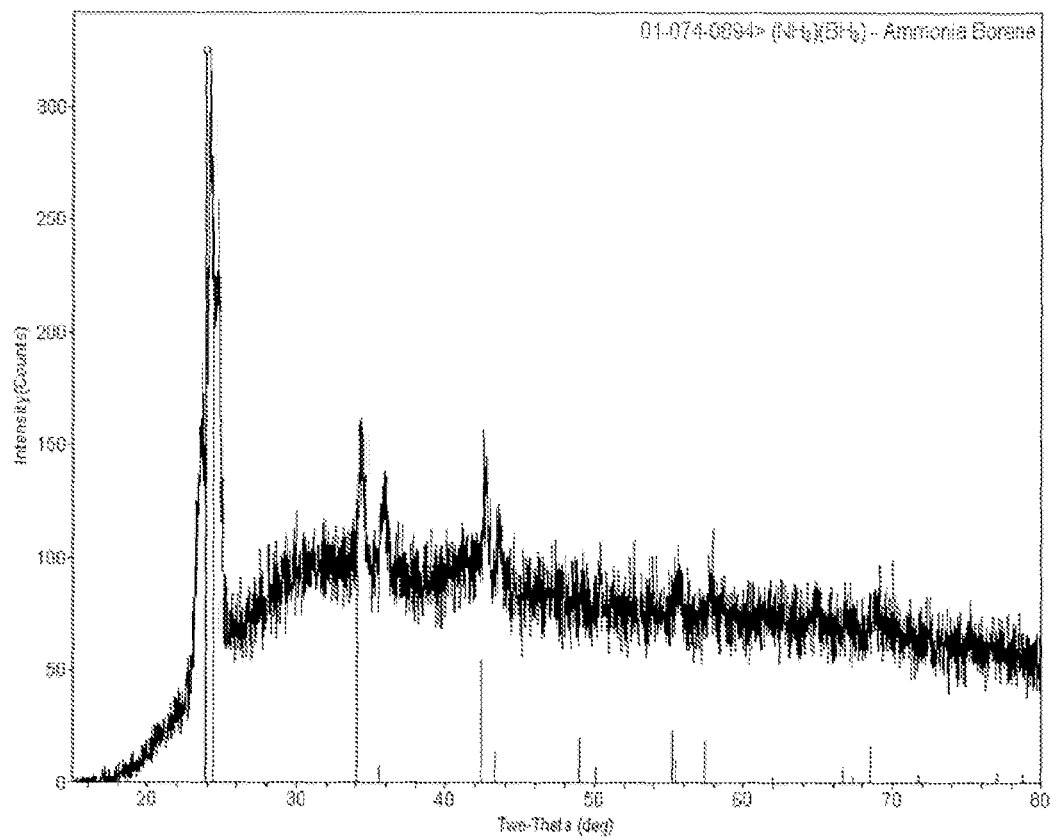
FIG. 1 is a reference x-ray powder diffraction pattern of ammonia borane.

Methods of preparing a boron-nitrogen compound are disclosed herein. The methods may be useful for preparing boron-nitrogen compounds for transportation applications, such as, but not limited to, hydrogen-powered automobiles, buses, motorcycles, aircraft, marine vessels, and rockets. For example, the boron-nitrogen compound may be useful for hydrogen storage. However, it is to be appreciated that the methods of the present disclosure may also be useful for other applications, e.g., construction and agricultural applications including tractors, earth-movers, and forklifts.

A method of preparing a boron-nitrogen compound includes combining an ammonium salt and an ionic compound in the absence of solvent to form a mixture. That is, the boron-nitrogen compound is prepared via mechanical agitation, as set forth in more detail below, and therefore minimizes the use of flammable solvents.

For the method, the ammonium salt may be any suitable ammonium salt known in the art. For example, the ammonium salt may include a cation selected from the group of ammonium, alkyl ammonium, aryl ammonium, and combinations thereof, and an anion including an element selected from the group of Group 15-17 elements of the periodic table. Therefore, suitable ammonium salts may include, but are not limited to, ammonium bromide, ammonium hydroxide, methylammonium chloride, dimethylammonium bromide, ethyl dimethylammonium fluoride, tetrabenzylammonium hydroxide, and like compounds. Examples of other suitable ammonium salts include triphenylmethylammonium fluoride, triphenylmethylammonium chloride, triphenylmethylammonium bromide, N,N,N-trimethylanilinium bromide, N,N-diethyl-N-ethylanilinium bisulfate, trimethylnaphthylammonium chloride, p-methylphenyl trimethyl ammonium chloride, 4-pyridyltriethyl ammonium chloride, N,N-dibutyl morpholinium chloride, and like compounds. Other suitable ammonium salts include, but are not limited to, tetrabenzyl-, benzyltrimethyl-, benzyltriethyl- and benzyltributylammonium chlorides, bromides, methylsulfates, and like compounds. In one particular example, the ammonium salt may be ammonium chloride.

The ionic compound includes a cation and an anion. The cation may be a metal cation, such as, but not limited to, $Na^+$ and $Li^+$. The anion is represented by the general formula $B(R^1)_4^-$, wherein each $R^1$ is independently selected from the group of hydrogen, alkyl groups, aryl groups, and combinations thereof. That is, each $R^1$ may be the same or different from another $R^1$. Suitable alkyl groups include, but are not limited to, methyl, ethyl, propyl, butyl, and pentyl groups. Further, suitable aryl groups include, but are not limited to, phenyl, benzyl, thiophenyl, and indoyl groups. For example, the ionic compound may be a metal borohydride or a metal borane.

More specifically, the metal borohydride may be any suitable metal borohydride known in the art. That is, the metal borohydride may be selected from the group of monovalent metal borohydrides, alkyl borohydrides, aryl borohydrides, and combinations thereof. Examples of suitable monovalent metal borohydrides include lithium borohydride, potassium borohydride, and like compounds. Further, examples of suitable alkyl borohydrides include potassium methyl borohydride, sodium ethyl borohydride, lithium ethyl methyl borohydride, and like compounds. An example of a suitable aryl borohydride includes lithium phenyl borohydride and like compounds. In one particular example, the metal borohydride may be sodium borohydride.

Likewise, the metal borane may be any suitable metal borane known in the art. For example, the metal borane may be potassium methylborane, sodium ethylborane, lithium phenylborane, and like compounds.

The ammonium salt and the ionic compound may be combined by any suitable method in the absence of solvent to form the mixture. For example, the ammonium salt may be added to the ionic compound or the ionic compound may be added to the ammonium salt. Further, the ammonium salt and the ionic compound may be combined in any suitable quantity and molar ratio. In one example, the ammonium salt and the ionic compound may be combined in a 1:1 molar ratio.

For the method, the ammonium salt and the ionic compound are not combined in solution. Rather, the method includes agitating the mixture in the absence of solvent to form a reaction product.

In one non-limiting example, agitating may be further defined as attritor milling. As used herein, the terminology "attritor milling" refers to a mechanical grinding process in which a starting material is subjected to repeated collisions with an internally agitated, expanding grinding media. Attritor milling may be carried out by any suitable attritor, e.g. a batch attritor or a horizontal attritor. The attritor may include a stationary vessel, a rotating shaft including arms, and the grinding media. Suitable grinding media may be formed from, for example, ceramic, glass, zirconia, alumina, and steel. In operation, the attritor may agitate the grinding media and the mixture of the ammonium salt and the ionic compound via the rotating shaft and arms to provide the expanding grinding media having kinematic porosity. The expanding grinding media moves, collides, and impinges the mixture, which generates shear and impact for grinding the mixture.

In another non-limiting example, agitating may be further defined as ball milling. As used herein, the terminology "ball milling" refers to a mechanical alloying process in which a starting material is subjected to repeated collisions with grinding balls to cause deformation, fracture, welding, and microstructural refinement of the material. Ball milling may be carried out by any suitable ball milling device, such as a planetary ball mill or a centrifugal ball mill. The ball milling device may include one or more wells and/or vessels and a plurality of balls. Suitable balls may be formed from, for example, ceramic, stainless steel, lead, antimony, brass, bronze, flint, and combinations thereof, and may have a diameter of at least 0.05 mm. In operation, the ball milling device may agitate the mixture of the ammonium salt and the ionic compound so that the plurality of balls mechanically crush and mix the mixture.

Processing parameters such as, but not limited to, speed of ball milling, acceleration, time of ball milling, ball size, well size, a ratio of volume of balls to volume of mixture, and a ratio of number of wells to number of balls may each be selected according to desired properties of the reaction product. Further, selection of one of the aforementioned processing parameters may determine another processing parameter. That is, the aforementioned processing parameters may be interrelated. Additionally, the aforementioned processing parameters may vary according to the scale of the agitation, e.g., batch scale or industrial scale. In one example, a ratio of volume of balls to volume of mixture may be from 1:100 to 10:1, and a speed of agitation may be greater than or equal to approximately 10 rpm. Ball milling may be further defined as grinding the mixture at an acceleration of from greater than or equal to approximately 1 g, preferably greater than or equal to approximately 6 g, for greater than or equal to approximately 0.1 hour, preferably for longer than about 2 hours. In one example, the mixture may be agitated by a planetary ball mill at an acceleration of approximately 20 g for about 2 hours. In another example, agitating the mixture at an acceleration of at least approximately 6.7 g provides the reaction product within approximately 12 hours.

In another non-limiting example, agitating may be further defined as stirring. For example, the mixture of the ammonium salt and the ionic compound may be mechanically stirred via any suitable implement. For example, the mixture may be mechanically stirred via an agitator, a blade, or a rod.

In another non-limiting example, agitating may be further defined as shaker milling. As used herein, the terminology "shaker milling" refers to a mechanical milling process in which a starting material is subjected to repeated vibrations in multiple orthogonal directions. Shaker milling may be carried out by any suitable device, e.g. a shaker ball mill. In operation, the device may agitate a vial containing a plurality of balls and the mixture of the ammonium salt and the ionic compound at a desired frequency and speed.

The resulting reaction product may include a salt byproduct of a reaction between the ammonium salt and the ionic compound. As such, the method further includes separating the boron-nitrogen compound from the reaction product. The boron-nitrogen compound may be separated from the reaction product via any suitable process. For example, separating may be further defined as recrystallizing the boron-nitrogen compound in a solvent. In another example, separating may be further defined as dissolving the reaction product in a solvent. The solvent may be any suitable solvent that dissolves the boron-nitrogen compound and/or the reaction product. For example, the solvent may be organic. That is, the solvent may be selected from the group of tetrahydrofuran, acetonitrile, diethylether, and combinations thereof. In one particular example, the solvent may be tetrahydrofuran.

For the method, the resulting boron-nitrogen compound may be represented by the general formula $N(R^2)_3B(R^3)_3$. Each $R^2$ and each $R^3$ is independently selected from the group of hydrogen, alkyl groups, aryl groups, and combinations thereof. That is, $R^2$ may be the same or different from $R^3$, each $R^2$ may be the same or different from another $R^2$, and each $R^3$ may be the same or different from another $R^3$. For $R^2$ and $R^3$, suitable alkyl groups include aromatic or nonaromatic, substituted or unsubstituted, saturated or unsaturated $C_1$-$C_{10}$ alkyl groups. Suitable aryl groups include substituted or unsubstituted $C_6$-$C_{20}$ aryl groups.

In another example, the resulting boron-nitrogen compound may be represented by the general formula $N(R^4)_4B(R^5)_4$. Each $R^4$ and each $R^5$ is independently selected from the group of hydrogen, alkyl groups, aryl groups, and combinations thereof. That is, $R^4$ may be the same or different from $R^5$, each $R^4$ may be the same or different from another $R^4$, and each $R^5$ may be the same or different from another $R^5$. For $R^4$ and $R^5$, suitable alkyl groups include aromatic or nonaromatic, substituted or unsubstituted, saturated or unsaturated $C_1$-$C_{10}$ alkyl groups. Suitable aryl groups include substituted or unsubstituted $C_6$-$C_{20}$ aryl groups.

The resulting boron-nitrogen compound may be a boron-nitrogen-hydride. In one example, the boron-nitrogen compound may be ammonia borane. In another example, the boron-nitrogen compound may be a derivative of ammonia borane, such as, but not limited to, methyl ammonia borane. That is, one or more hydrogen atoms connected to a nitrogen atom or boron atom of ammonia borane may be substituted by one or more alkyl or aryl groups to form the boron-nitrogen compound.

For applications including ammonia borane as the boron-nitrogen compound, the boron-nitrogen can release up to 19.6 wt % hydrogen and may be useful for hydrogen storage systems requiring a reversible uptake of 0.081 kg $H_2$/L at a rate of at least 2 kg $H_2$/min for more than 1,500 cycles. Further, ammonia borane is suitable for systems having an operating temperature of from about 40 to 60° C.

In another embodiment, a method of preparing a boron-nitrogen compound includes agitating the ammonium salt in the absence of solvent, and agitating the ionic compound in the absence of solvent. The method also includes combining the agitated ammonium salt and the agitated ionic compound in the absence of solvent to form the mixture. That is, in this embodiment, the ammonium salt and the ionic compound may each be agitated independently prior to combination to form the mixture. Further, the method includes agitating the mixture in the absence of solvent to form the reaction product and separating the boron-nitrogen compound from the reaction product.

The ammonium salt, the ionic compound, and the mixture may be agitated by any suitable process as set forth above. For example, the ammonium salt and/or the ionic compound may each be attritor milled or ball milled before combination.

The methods of the present disclosure are cost effective and prepare effective, reliable boron-nitrogen compounds in sufficient yield and purity that have excellent hydrogen storage and release characteristics. That is, since the boron-nitrogen compounds are prepared via mechanical agitation in the absence of solvent, the methods minimize the use of expensive and flammable solvents. Further, the methods also minimize the production of hydrogen gas in the presence of such flammable solvents.

The following example is meant to illustrate the disclosure and is not to be viewed in any way as limiting to the scope of the disclosure.

EXAMPLE

Example 1

Synthesis of Ammonia Borane from Ammonium Chloride and Sodium Borohydride

One thousand eight hundred forty-two grams of grinding balls, each grinding ball having a diameter of about 5 mm, 24.91 grams (466 mmol) ammonium chloride, and 17.63 grams (466 mmol) sodium borohydride are combined in the absence of solvent in a 702 ml steel well to form a mixture. The well is sealed and the mixture is agitated in the absence of solvent at a speed of 600 revolutions per minute (rpm) for 6 hours in a stirred media mill (Union Process 01-HD/HDDM) to form a reaction product. The well is unsealed and a boron-nitrogen compound of Example 1 is separated from the reaction product by recrystallization. The boron-nitrogen compound is recrystallized from tetrahydrofuran to prepare 10.7 g as a white powder.

Figure 2:
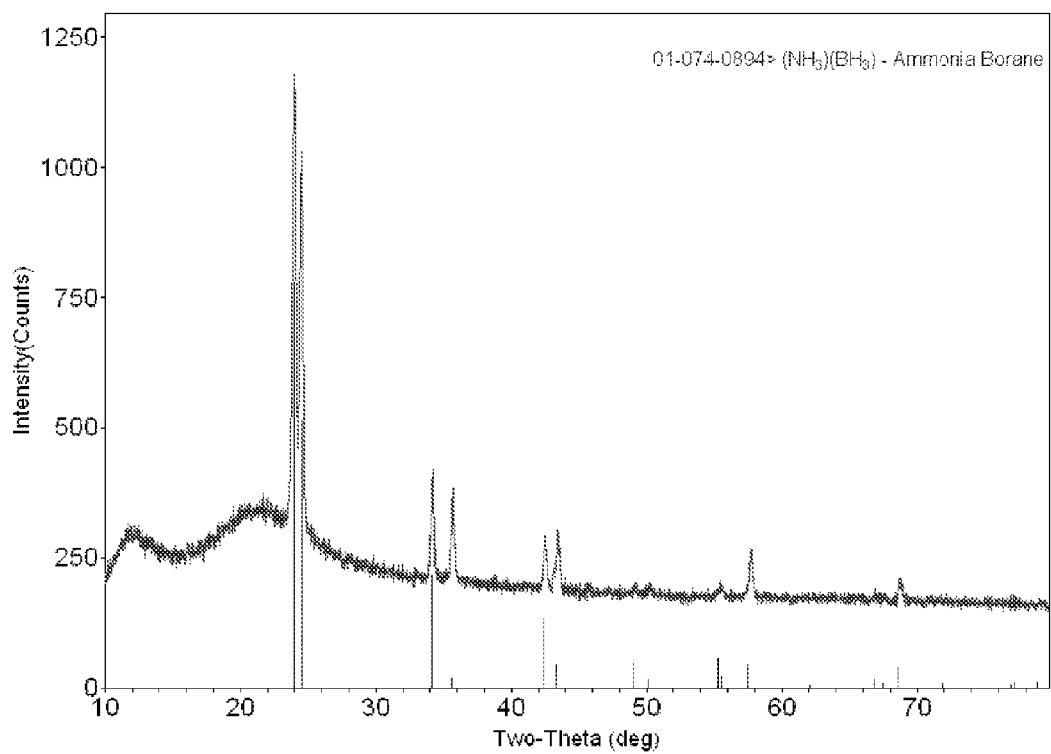
FIG. 2 is an x-ray powder diffraction pattern of ammonia borane prepared via a method of Example 1.

The boron-nitrogen compound of Example 1 is analyzed via x-ray powder diffraction to produce the x-ray powder diffraction pattern of FIG. 2. Referring to FIGS. 1 and 2, the x-ray powder diffraction pattern of the boron-nitrogen compound (FIG. 2) matches a reference x-ray powder diffraction pattern simulated from the single crystal structure of ammonia borane (FIG. 1). Therefore, the boron-nitrogen compound of Example 1 is ammonia borane.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of preparing a boron-nitrogen compound, the method comprising the steps of:
   combining;
   an ammonium salt; and
   an ionic compound including;
   a cation; and
   an anion represented by the general formula $B(R^1)_4^-$;
   in the absence of solvent to form a mixture;
   wherein each $R^1$ is independently selected from the group of hydrogen, alkyl groups, aryl groups, and combinations thereof;
   agitating the mixture in the absence of solvent to form a reaction product; and
   separating the boron-nitrogen compound from the reaction product;
   wherein the boron-nitrogen compound is represented by the general formula $N(R^2)_3B(R^3)_3$;
   wherein each $R^2$ and $R^3$ is independently selected from the group of hydrogen, alkyl groups, aryl groups, and combinations thereof.

2. The method of claim 1, wherein the boron-nitrogen compound is ammonia borane.

3. The method of claim 1, wherein agitating is further defined as ball milling.

4. The method of claim 3, wherein said ball milling is further defined as grinding the mixture at an acceleration of from greater than or equal to approximately 1 g for from greater than or equal to approximately 0.1 hour.

5. The method of claim 1, wherein agitating is further defined as attritor milling.

6. The method of claim 1, wherein agitating is further defined as stirring.

7. The method of claim 1, wherein agitating is further defined as shaker milling.

8. The method of claim 1, wherein the ammonium salt includes a cation selected from the group of ammonium, alkyl ammonium, aryl ammonium, and combinations thereof, and an anion including an element selected from the group of Group 15-17 elements of the periodic table.

9. The method of claim 1, wherein the ammonium salt is ammonium chloride.

10. The method of claim 1, wherein the ionic compound is a metal borohydride.

11. The method of claim 10, wherein the metal borohydride is selected from the group of monovalent metal borohydrides, alkyl borohydrides, aryl borohydride, and combinations thereof.

12. The method of claim 11, wherein the metal borohydride is sodium borohydride.

13. The method of claim 1, wherein the ammonium salt and the ionic compound are combined in a 1:1 molar ratio.

14. The method of claim 1, wherein separating is further defined as recrystallizing the boron-nitrogen compound in a solvent.

15. The method of claim 14, wherein the solvent is organic.

16. The method of claim 14, wherein the solvent is tetrahydrofuran.

17. The method of claim 1, wherein separating is further defined as dissolving the reaction product in a solvent.

18. A method of preparing a boron-nitrogen compound, the method comprising the steps of:
combining;
an ammonium salt; and
an ionic compound including;
a cation; and
an anion represented by the general formula $B(R^1)_4^-$;
in the absence of solvent to form a mixture;
wherein each $R^1$ is independently selected from the group of hydrogen, alkyl groups, aryl groups, and combinations thereof;
agitating the mixture in the absence of solvent to form a reaction product; and
separating the boron-nitrogen compound from the reaction product;
wherein the boron-nitrogen compound is represented by the general formula $N(R^4)_4B(R^5)_4$;
wherein each $R^4$ and each $R^5$ is independently selected from the group of hydrogen, alkyl groups, aryl groups, and combinations thereof.

19. The method of claim 18, wherein agitating is further defined as ball milling.

20. A method of preparing a boron-nitrogen compound, the method comprising the steps of:
agitating an ammonium salt in the absence of solvent;
agitating an ionic compound including;
a cation; and
an anion represented by the general formula $B(R^1)_4^-$;
in the absence of solvent;
wherein each $R^1$ is independently selected from the group of hydrogen, alkyl groups, aryl groups, and combinations thereof;
combining the agitated ammonium salt and the agitated ionic compound in the absence of solvent to form a mixture;
agitating the mixture in the absence of solvent to form a reaction product; and
separating the boron-nitrogen compound from the reaction product.

* * * * *